US006728434B2

(12) United States Patent
Flanders

(10) Patent No.: US 6,728,434 B2
(45) Date of Patent: Apr. 27, 2004

(54) MEMS DYNAMIC OPTICAL SPECTRAL FILTER

(75) Inventor: Dale C. Flanders, Lexington, MA (US)

(73) Assignee: Axun Technologies, Inc., Billerica, MA (US)

(*) Notice: Subject to any disclaimer, the term of this patent is extended or adjusted under 35 U.S.C. 154(b) by 0 days.

(21) Appl. No.: 09/873,910

(22) Filed: Jun. 4, 2001

(65) Prior Publication Data

US 2002/0181849 A1 Dec. 5, 2002

(51) Int. Cl.[7] .............................. G02B 6/20; G02B 6/42
(52) U.S. Cl. ........................................... 385/18; 385/17
(58) Field of Search ............................ 385/17, 18, 19, 385/24, 47, 74; 398/79, 82, 85, 94, 118, 45, 50, 55–57

(56) References Cited

U.S. PATENT DOCUMENTS

| 4,671,603 A | * | 6/1987 | McQuoid et al. ............. 359/15 |
| 5,953,467 A | | 9/1999 | Madsen ........................ 385/15 |
| 6,025,943 A | * | 2/2000 | Meekers et al. ............. 359/124 |
| 6,075,632 A | | 6/2000 | Braun ........................ 359/124 |
| 6,122,417 A | * | 9/2000 | Jayaraman et al. ........... 372/50 |
| 6,343,178 B1 | * | 1/2002 | Burns et al. ................ 359/847 |

OTHER PUBLICATIONS

Mizuno, Kazuyou; Nishi, Yasuhiro; Mimura, You; Lida, Yoshitaka; Matsuura, Hiroshi; Yoon, Daeyoul; Aso, Osamu; Yamamoto, Toshiro; Toratani, Tomoaki; Ono, Yoshimi; Yo, An, "Development of Etalon–Type Gain–Flattening Filter," Furukawa Review, No. 19, 2000, pp. 53–58.

* cited by examiner

Primary Examiner—Robert H. Kim
Assistant Examiner—Richard Kim
(74) Attorney, Agent, or Firm—J. Grant Houston

(57) ABSTRACT

A dynamic optical spectral filter is implemented in a microelectromechanical system (MEMS). It comprises a frame. An array of mirrors is provided on a first portion of the frame, along with a second array of adjustment mirrors on a second portion of the frame. An array of variable beam splitters is provided on a middle portion of the frame, between the first array and the second array. Finally, to provide the filter functionality, optical delays are disposed in beam paths between the first mirror array the second mirror array. These elements are used to produce multiple Mach-Zehnder interferometers, such as cascaded or series interferometers. Implementations have advantages associated with speed of operation and can have polarization isotropy.

15 Claims, 3 Drawing Sheets

__US 6,728,434 B2__

MEMS DYNAMIC OPTICAL SPECTRAL FILTER

BACKGROUND OF THE INVENTION

Dynamic optical spectral filters are a class of filters that can dynamically change the shape of their spectral filter transmission/reflection function. This distinguishes them from single cavity Fabry-Perot tunable filters, for example, in which, while the passband can be tuned across a band of interest, the passband shape itself is static or relatively static.

One proposed application for these dynamic optical spectral filters is as gain flattening filters. These filters are deployed at various stages along the optical fiber communication link to control the relative powers in the channels of some wavelength or frequency band of interest in a wavelength division multiplexed (WDM) optical signal. Gain tilt from optical amplifiers, such as erbium-doped fiber amplifiers (EDFA), or wavelength dependent losses, for example, can be neutralized.

Dynamic filters based on Mach-Zehnder interferometers, and more general arrayed waveguide grating filters, have been proposed and fabricated using integrated waveguide technology. Combinations of Bragg gratings and thermo-optic phase shifters are used to realize cascaded Mach-Zehnder interferometers. These integrated waveguide dynamic spectral filters have advantages associated with fabrication. Using photolithographic wafer processing techniques, completely integrated systems have been made.

SUMMARY OF THE INVENTION

The problem with these waveguide dynamic filters, however, concerns their size, response time, and polarization anisotropy. Typically, only a few filters can be fabricated on a wafer. Further, the modulation of the thermo-optic components can be relatively slow. Although this problem can be mitigated with good design, polarization anisotropy inherent in integrated waveguides is a more pernicious problem. In effect, the operation of the filter under otherwise static conditions changes due to changes in the polarization of the input light.

Two general approaches exist for addressing polarization anisotropy. A polarization homogenizer or scrambler can be used upstream of the waveguide dynamic spectral filter. This converts an input signal having an arbitrary or random polarization into an unpolarized signal. Scramblers typically add three decibels (dB) of insertion loss, however.

A second option is to use a polarization beam splitter and two waveguide spectral filters, one for each polarization. The problem here, however, is the detrimental impact to the system size and power requirements. Moreover, the unified control of the two filters is now required.

The present invention is directed to a dynamic optical spectral filter. Different from previous such filters, the present invention is directed to a microelectromechanical system (MEMS) implementation. Such implementations can be small, operate high speed, and be made isotropic with respect to polarization.

In general, according to one aspect, the invention features a dynamic optical spectral filter. It comprises a frame. An array of mirrors is provided on a first portion of the frame, along with a second array of adjustment mirrors on a second portion of the frame. An array of variable beam splitters is provided on a middle portion of the frame, between the first array and the second array. Finally, optical delays are disposed in beam paths between the first mirror array the second mirror array. These components yield cascaded or series Mach-Zehnder interferometers that can be collectively tuned to provide an arbitrary net filter function.

According to a preferred embodiment, the first mirror array, the second mirror array, and the beam splitter array form successive stages. These stages are preferably organized in a cascade or serial configuration. The optical delay in each of these stages is different to thereby yield different spectral periods (free spectral ranges) for the interferometers of each stage.

According to a specific embodiment, the optical delays for each of the stages are integer multiples of the smallest delay. This provides for Fourier series-like behavior that helps in obtaining the desired filter transmission profiles using control algorithms.

Further, according to the preferred embodiment, the adjustable mirrors are separate deflectable mirrors. Preferably, these are implemented as out-of-plane deflecting mirrors, which are preferably deflected using electrostatic forces or voltages. The variable beam splitter array is preferably implemented as short-cavity tunable Fabry-Perot cavities. Low finesse cavities with a very large free spectral range can be used to yield a relatively uniform reflectivity across the wavelength band of interest.

In general, according to another aspect, the invention features a dynamic optical spectral filter comprising cascaded Mach-Zehnder interferometers. Each of these interferometers includes a beam splitter comprising a short-cavity tunable Fabry-Perot cavity, a first mirror, and a second adjustable mirror. Typically, at least some of these interferometers include a discrete optical delay on one of the interferometer arms.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
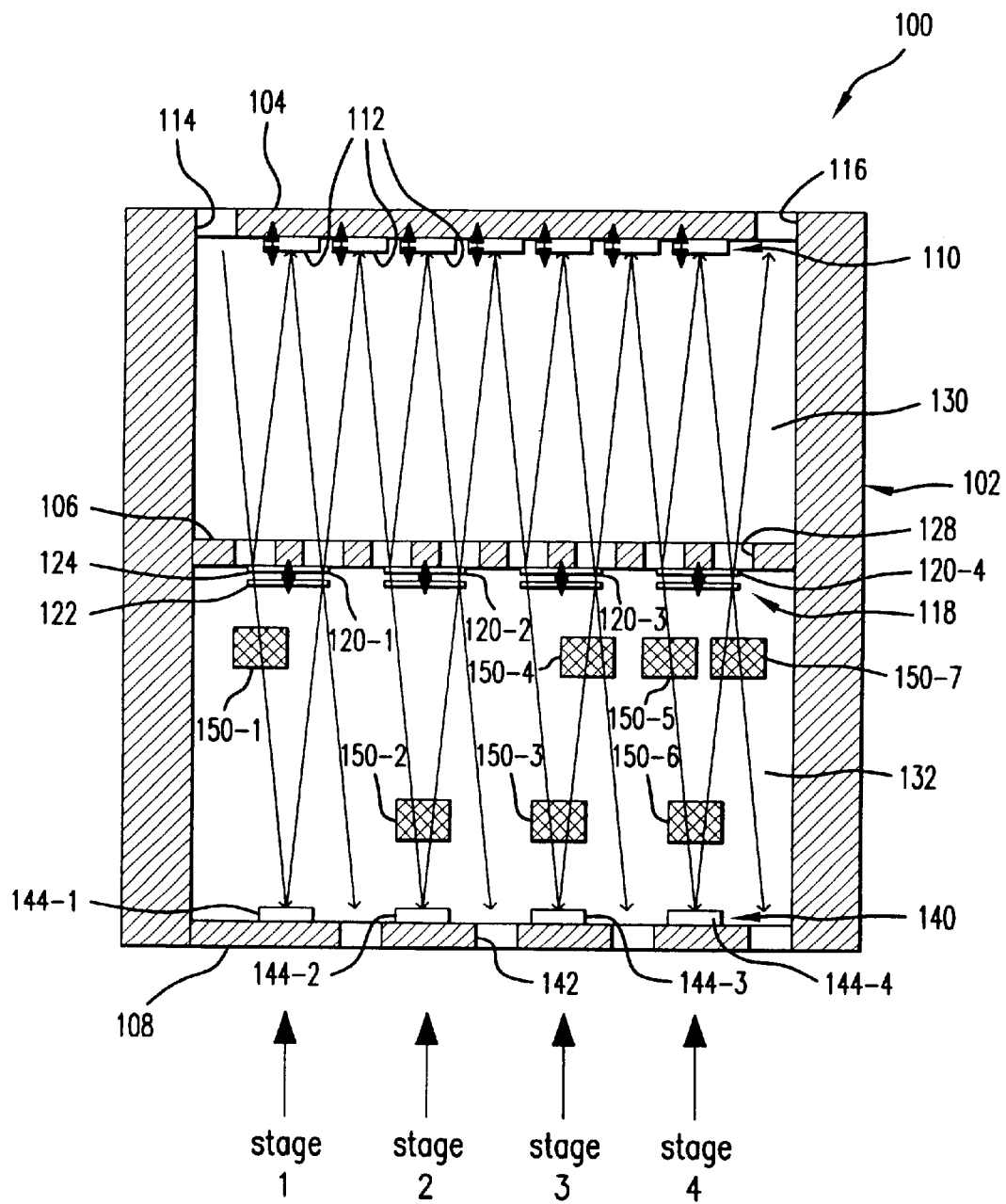
FIG. 1 is a plan view of a MEMS dynamic optical spectral filter according to the present invention.

FIG. 1 shows a MEMS dynamic optical spectral filter, which has been constructed according to the principles of the present invention.

Generally, the dynamic filter 100 comprises a frame 102. The frame 102 has an upper portion 104, a middle portion 106, and a lower portion 108, with reference to the arbitrary orientation of the figure.

An array 110 of deflectable mirrors 112 is installed on the upper portion 104 of the frame 102. Each deflectable mirror 112 of the array 110 is preferably implemented as a discrete optical membrane that has been coated to be highly reflective. Reflective coatings are preferably implemented with thin film dielectric coatings.

U.S. patent application Ser. No. 09/797,529, filed on Mar. 1, 2001, entitled "Integrated Tunable Fabry-Perot Filter and Method of Making Same", discloses the fabrication of a tunable MEMS optical membrane device that can be used as the deflectable mirrors 112. In one implementation, these membranes are used in a partially singulated state when the membrane-to-membrane pitch on the handle wafer is appropriate for the design of the filter 100. In this example, the upper frame portion 104 is formed from the handle wafer material of the unsingulated MEMS membrane bars, in some embodiments. In an alternative embodiment, the MEMS membranes are singulated and installed on a separate frame portion.

In the illustrated example, the upper frame portion 104 comprises an input port 114 and an output port 116.

An array of variable beam splitters 118 is attached to the middle frame portion 106. The individually controlled variable beam splitters 120 of the array 118 control balancing of the optical signals in the upper cavity 130 relative to the lower cavity 132.

In the present implementation, the array of variable beam splitters 118 is implemented as discrete beam splitters. Each discrete beam splitter 120 comprises a Fabry-Perot tunable filter, comprising an upper mirror 124 and a lower mirror 122. These mirrors 122, 124 have relatively low reflectivities to yield a relatively low finesse Fabry-Perot cavity and are spaced so that the free spectral range is much greater than the wavelength band of interest.

In one implementation, the finesse of the filters/beam splitters is less than 2.5 or 2.0. This yields an extinction ratio of 5 dB, which is greater than the minimum of 3 dB required. This minimum is achieved with a finesse of 1.6. A finesse range of 1.6 to about 1.8 is probably the minimum tolerable for good operation. Further, the free spectral ranges of the filters is much greater than four times the width of the band of interest to yield relatively uniform reflectance for the band. In one embodiment, the filters 118 operate in the first or second order in which the mirror spacing is between $\lambda/2$ and $\lambda$, wherein $\lambda$ is the center frequency of the band of interest.

As a result, the spectral filter function of each Fabry-Perot filter 120 is relatively uniform in transmission/reflection across the band of interest. Modulating the distance between the upper and the lower reflectors 124, 122 changes the reflectivity of the filters 120 with little regard to the wavelength of the input signal. This configuration allows the Fabry-Perot filters 120 to function as variable beam splitters in the present implementation.

In the current implementation, the Fabry-Perot filters 120 are implemented as described in Ser. No. 09/797,529 application with a separate non-deflecting mirror structure.

In one implementation, the variable beam splitters 120 are attached to a separate middle portion 106. In an alternative implementation, the handle wafer material of partially singulated filter membranes functions as the middle portion 106 of the frame 102.

Further, in the illustrated embodiment, the middle frame portion 106 comprises separate optical port regions 128 that allow transmission between the upper cavity 130 and the lower cavity 132 of the filter 100. Whether the optical port regions are implemented as simply antireflection (AR) coated regions or actual holes through the frame depends on the transmissivity of the material of the frame. Generally, however, actual holes are preferred to reduce scattering and lower insertion loss.

An array 140 of stationary mirrors 144 is provided on the lower portion 108 of the frame 102. These function as fold mirrors to redirect the optical signals back to the variable beam splitter array 118. Further, in the illustrated embodiment, ports 142 are provided in the lower portion 140 to enable rejected light to leave the filter 100.

Distributed in the lower cavity 132 are a series of optical delays 150-1 to 150-7 for the Mach-Zehnder interferometer arms. In the illustrated implementation where a free space interconnect is provided between the arrays of mirrors 110, 140 and the variable beam splitters 118, the optical delays 150 can be implemented as AR-coated glass blocks, for example. Generally, they can be implemented as any high refractive index, transparent material.

In the present embodiment, the blocks 150-1 to 150-7 all provide substantially the same amount of delay. They are distributed in the cavity, however, so that the stages, stage 1-stage 4, of the filter 100, each see different amounts of delay. Specifically, delay 150-1 is provided on only one leg of the signal transmission between the variable beam splitter 120-1 and stationary mirror 144-1. In contrast, in stage 2, delay 150-2 provides essentially twice the delay. Finally, for stage 4, for example, three blocks of delay material 150-5, 150-6, 150-7 provide essentially four times the delay for stage 4 relative to stage 1.

Figure 2:
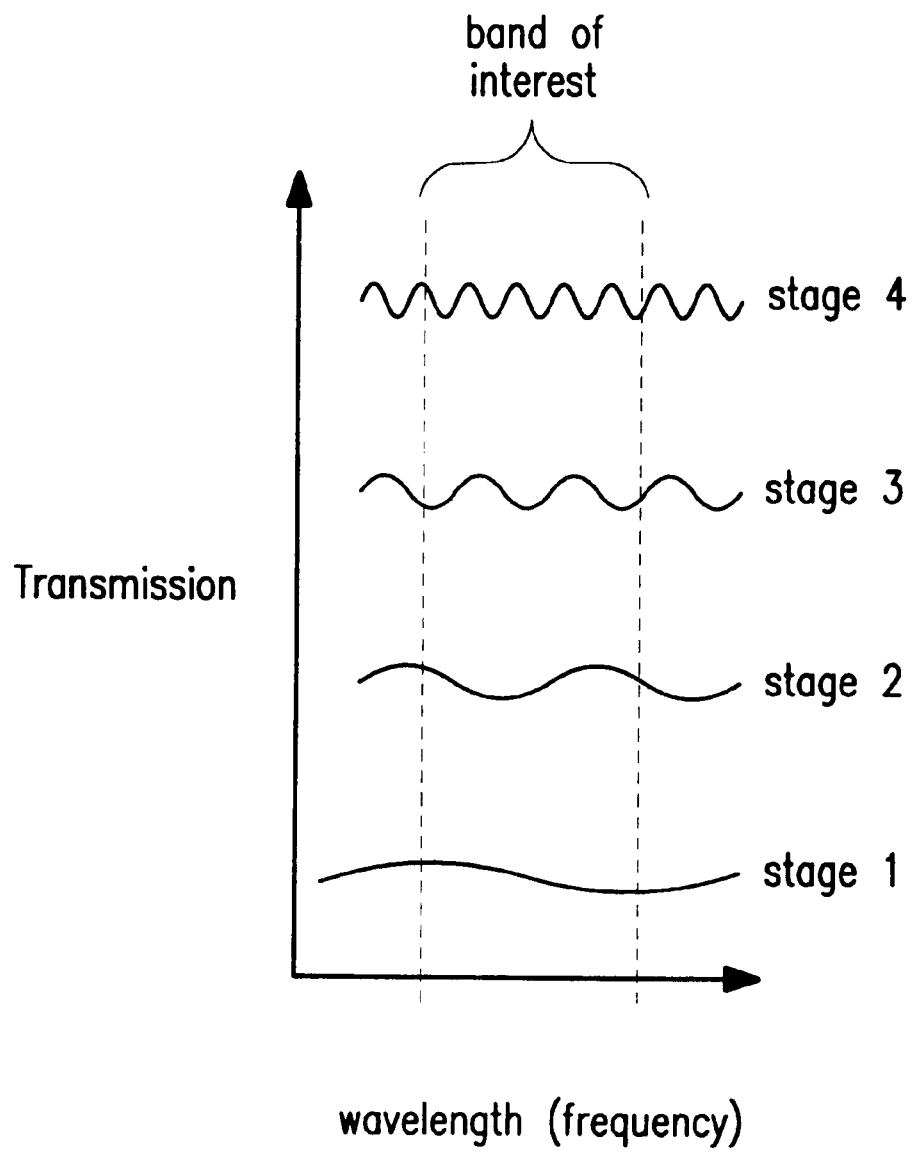
FIG. 2 is a plot of transmission as a function of frequency for the interferometers of each of the stages of the dynamic filter.

FIG. 2 is a plot of transmission as a function of frequency for each of the four stages of filter 100 to thereby illustrate its operation. Specifically, the filter 100 is designed to operate across some band of interest. Typically, this is in the communication wavelengths between 1,000 and 2,000 nm. For example, the band of interest can be C, L, or S bands in the ITU grid.

The delay 150-1 for stage 1 of filter 100 is selected so that the spectral period of the filter function is roughly equivalent to the band of interest.

As a result, stage 2 has a period that is then relatively one-half the band of interest, stage 3 has a spectral period that is approximately one-third the band of interest, and stage 4 has a spectral period that is one-fourth the period of the band of interest.

The filter functions of stage 1–4 are combined to yield a net filter function based on the Fourier series composition of the contribution of each stage. This is accomplished by modulating the magnitude of the contribution to the net filter function of each the stages 1 through stage 4, by the independent control of the reflectivity of the separate variable beam splitters 120 of the beam splitter array 118. The spectral phase of the filter functions of each of the stages is controlled by modulating the tunable mirrors 112 of the tunable mirror array 110.

Figure 3:
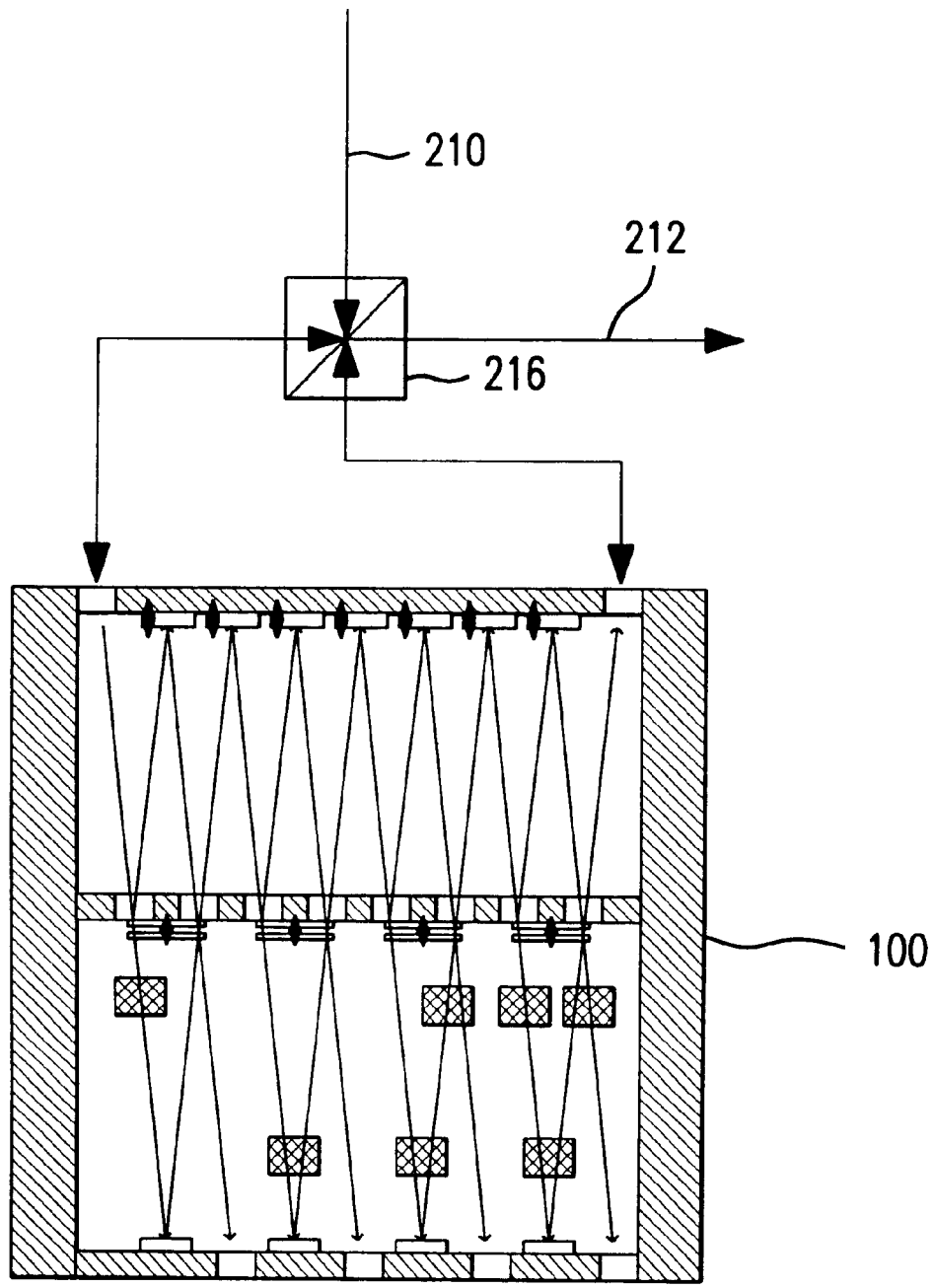
FIG. 3 is a schematic view showing a bi-directional implementation to counteract any polarization anisotropy in the filter.

FIG. 3 illustrates an embodiment that addresses polarization anisotropy. Generally, in some cases the elements in the filter 100 may have some polarization anisotropy. In such a situation, a circulator can provided in combination with a beam splitter. Signals are sent each way through the filter 100. The filtered signal is separated using the circulator.

In still another embodiment, the requirement for the circulator 214 is removed by separating the incoming signal 210 and filtered light using a polarization beam splitter 216, assuming that the polarization is not changed in the filter 100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A dynamic optical spectral filter, comprising:

a frame;

a first array of mirrors on a first portion of the frame;

a second array of adjustable mirrors on a second portion of the frame;

an array of variable beam splitters on a middle portion of the frame, between the first array and the second array, each of the variable beam splitters being tunable to control how beams are split between the first and second array; and optical delays disposed in beams paths between the first mirror array and the second mirror array.

2. A dynamic optical spectral filter as claimed in claim 1, wherein the first mirror array, the second mirror array, and the beam splitter array form successive stages, wherein the optical delays of each of the stages is different.

3. A dynamic optical spectral filter as claimed in claim 1, wherein the optical delays for each of stages are an integer multiple of the stage with the smallest delay.

4. A dynamic optical spectral filter as claimed in claim 1, wherein the first mirror array, the second mirror array, and the beam splitter array form successive stages having filter functions with different spectral periods.

5. A dynamic optical spectral filter as claimed in claim 1, wherein adjustable mirrors of the second array comprise separate deflectable mirrors.

6. A dynamic optical spectral filter as claimed in claim 1, wherein deflectable mirrors comprise optical membranes that are deflected out of plane by an electrostatic voltage.

7. A dynamic optical spectral filter as claimed in claim 1, wherein the variable beam splitters each comprise a tunable Fabry-Perot cavity.

8. A dynamic optical spectral filter as claimed in claim 1, wherein the middle portion of the frame comprises optical ports through which optical beams propagate between the first array and the second array.

9. A dynamic optical spectral filter as claimed in claim 1, wherein the first mirror array, the second mirror array, and the beam splitter array form at least three successive stages.

10. A dynamic optical spectral filter, comprising cascaded Mach-Zehnder interferometers, wherein each interferometer includes:

a beam splitter including a tunable Fabry-Perot cavity;

a first mirror;

a second, adjustable mirror.

11. A dynamic optical spectral filter as claimed in claim 10, wherein at least some of the interferometers comprise an optical delay element.

12. A dynamic optical spectral filter as claimed in claim 10, wherein each of the optical delays is different.

13. A dynamic optical spectral filter as claimed in claim 10, wherein the optical delays are integer multiples of each other.

14. A dynamic optical spectral filter as claimed in claim 10, wherein the optical delay of each interferometer is disposed in a beam path between the beam splitter and the first mirror.

15. A dynamic optical spectral filter as claimed in claim 10, further comprising a frame for supporting the first mirror, the adjustable mirror and the beam splitter of each of the interferometers.

* * * * *